United States Patent [19]

Mizuhara

[11] Patent Number: 5,120,374
[45] Date of Patent: * Jun. 9, 1992

[54] GEL FOR BRAZING FILLER METAL PASTE

[75] Inventor: Howard Mizuhara, Hillsborough, Calif.

[73] Assignee: The Morgan Crucible Company plc, Windsor, England

[*] Notice: The portion of the term of this patent subsequent to Apr. 24, 2007 has been disclaimed.

[21] Appl. No.: 522,339

[22] Filed: May 11, 1990

[51] Int. Cl.$^5$ .................. B23K 35/34; B01J 13/00
[52] U.S. Cl. ........................ 148/24; 148/25; 252/315.4; 106/1.13
[58] Field of Search ............ 252/315.4; 148/24, 25; 106/1.13

[56] References Cited

U.S. PATENT DOCUMENTS

| | | | |
|---|---|---|---|
| 3,717,442 | 2/1973 | Knopp | 29/182.2 |
| 4,084,939 | 4/1978 | Zmoda | 44/7 |
| 4,919,730 | 4/1990 | Mizuhara | 148/24 |

Primary Examiner—Richard D. Lovering
Assistant Examiner—N. Bhat
Attorney, Agent, or Firm—Kilpatrick & Cody

[57] ABSTRACT

A brazing paste gel has a composition of 1-4 wt. % hydroxypropylcellulose, 40-80 wt. % 1,2-propanediol, 18-58 wt. % 2-propanol. Alternatively, the composition may be 1-4 wt. % hydroxypropylcellulose, 20-70 wt. % 1,2-propanediol, 26-76 wt. % water.

13 Claims, No Drawings

GEL FOR BRAZING FILLER METAL PASTE

This invention concerns a gel that can be used in making a brazing filler metal paste. Problems with prior art gels are that they are immiscible with water or react with metals contained in chemically active brazing alloys or leave a carbonaceous residue after brazing. Other problems are sudden outgassing upon heating in vacuum or inability to maintain suspension of heavily loaded powdered brazing metal for adequate shelf life. This invention discloses a gel which overcomes these problems.

A gel in accordance with this invention has a composition of, in weight percent, 1-4 of hydroxypropylcellulose (HPC), 40-80 of 1,2-propanediol and 18-58 of 2-propanol. Water may be substituted for the 2-propanol in which case a gel in accordance with this invention has a composition of, in weight percent, 1-4 of HPC, 20-70 of 1,2-propanediol and 36-76 of water.

A metal powder to gel weight ratio of 85% metal to 15% gel mixes well to form a paste that, upon melting, forms a clean bright metal bead in a clean white dense alumina crucible.

EXAMPLE 1

A gel consisting of 2 wt.% HPC, 70 wt.% 1,2-propanediol and 28 wt.% 2-propanol was mixed with minus 150 mesh Cusil atomized powder in a ratio of 8% gel to 92% metal powder. The HPC used was Klucel Type H made by Aqualon Company, Wilmington, Del. Cusil is a trademark of Wesgo Division, GTE Products Corporation and is a brazing alloy of 72 wt.% silver, 28 wt% copper. The material was well mixed and placed into a 30cc syringe. A #18 needle was attached and, using about 30 psi pneumatic force, the paste was extruded onto a Kovar T joint. Kovar is a nickel-iron-cobalt alloy made by Westinghouse Corporation. The paste was dried in an 80° C. oven for two hours and then placed in a vacuum furnace and brazed at 820° C. for ten minutes under $10^{-5}$ torr vacuum. An excellent clean brazed joint without any residue was produced.

EXAMPLE 2

The gel of Example 1 was mixed with pure atomized copper (minus 150 mesh) in a ratio of 90% copper to 10% gel. The copper paste was placed along a 1010 steel to 1010 steel overlap joint and brazed at 1100° C. under $10^{-5}$ torr vacuum. A bright clean braze was made.

EXAMPLE 3

A gel of 2½ wt.% HPC, 60 wt.% 1,2-propanediol and 37½ wt.% 2-propanol was mixed with finely powder Nicusil in a ratio of 8% gel to 92% Nicusil to form a thick paste. Nicusil is a trademark of Wesgo Division and is a brazing alloy of 56 wt.% silver, 42 wt.% copper, and 2 wt.% nickel. The paste in a syringe was extruded through a #18 needle onto the base of a 410 stainless steel T. The paste was dried at 80° C. in an oven for one hour and then vacuum brazed at 920° C. for ten minutes under $10^{-5}$ torr vacuum. An excellent low ash braze resulted.

EXAMPLE 4

The gel of Example 3 was mixed with Cusil ABA powder in a ratio of 10% gel to 90% metal powder. Cusil ABA is a trademark of Wesgo Division and is a grazing alloy of 25.25 wt.% copper, 63 wt.% silver, and 1.75 wt.% titanium. The paste was placed between an alumina disc, which was ½" diameter by ¼" thick, and a copper disc, which was 1" diameter by 60 mils thick. The paste was dried at 100° C. for one hour, then vacuum brazed at 825° C. under $10^{-5}$ torr vacuum. An excellent ceramic to metal joint resulted.

EXAMPLE 5

A gel of 3 wt.% HPC, 50 wt.% 1,2-propanediol and 47 wt.% 2-propanol was mixed with minus 150 mesh Nioro powder in a ratio of 16% gel to 84% metal powder. Nioro is a trademark of Wesgo Division and is a brazing alloy of 82 wt.% gold, 18 wt.% nickel. The paste was applied across a 410 stainless steel overlap and vacuum brazed at 1000° C. under $10^{-5}$ torr vacuum with excellent results.

EXAMPLE 6

A gel of 3 wt.% HPC, 50 wt.% 1,2-propanediol and 47 wt.% water was mixed with AMS-4777 atomized powder (minus 150 mesh) in a ratio of 16% gel to 84% metal powder. AMS-4477 is a nickel-boron-silicon brazing alloy made by Wesgo Division. A braze of 410 stainless steel to 410 stainless steel was made at 1030° C. under $10^{-5}$ torr vacuum. An excellent braze joint resulted.

Brazing pastes made from gels in accordance with this invention consist of 86-92 wt.% brazing metal powder, 8-14 wt.% gel.

I claim:

1. A brazing paste gel having a composition of 1-4 wt.% hydroxypropylcellulose (HPC), 40-80 wt% 1,2-propanediol, 18-58 wt.% 2-propanol.
2. The gel of claim 1 consisting of 2 wt.% HPC, 70 wt.% 1,2-propanediol, 28 wt.% 2-propanol.
3. The gel of claim 1 consisting of 2½ wt.% HPC, 60 wt.% 1,2-propanediol, 37½ wt.% 2-propanol.
4. The gel of claim 1 consisting of 3 wt.% HPC, 50 wt.% 1,2-propanediol, 47 wt.% 2-propanol.
5. A brazing paste gel having a composition of 1-4 wt.% HPC, 20-70 wt.% 1,2-propanediol, 26-76 wt% water.
6. The gel of claim 5 consisting of 3 wt.% HPC, 50 wt.% 1,2-propanediol, 47 wt.% water.
7. A brazing paste consisting of 8-14 wt.% of a gel of claim 1 and 86-92 wt.% brazing metal powder.
8. A brazing paste consisting of 8 wt.% of the gel of claim 2 and 92 wt.% of minus 150 mesh silver-copper alloy powder.
9. A brazing paste consisting of 10 wt.% of the gel of claim 2 and 90 wt.% of minus 150 mesh atomized copper powder.
10. A brazing paste consisting of 8 wt.% of the gel of claim 3 and 92 wt.% of minus 150 mesh silver-copper-nickel alloy powder.
11. A brazing paste consisting of 10 wt.% of the gel of claim 3 and 90 wt.% of copper-silver-titanium alloy powder.
12. A brazing paste consisting of 14 wt.% of the gel of claim 4 and 86 wt.% of minus 150 mesh gold-nickel alloy powder.
13. A brazing paste consisting of 14 wt.% of the gel of claim 6 and 86 wt.% of minus 150 mesh nickel-boron-silicon alloy powder.

* * * * *

UNITED STATES PATENT AND TRADEMARK OFFICE
CERTIFICATE OF CORRECTION

PATENT NO. : 5,120,374

DATED : June 9, 1992

INVENTOR(S) : Howard Mizuhara

It is certified that error appears in the above-identified patent and that said Letters Patent is hereby corrected as shown below:

```
Column 1, line 21, delete "36-76" and insert --26-76--
therefor
```

Signed and Sealed this

Twenty-fifth Day of October, 1994

Attest:

BRUCE LEHMAN

*Attesting Officer*    *Commissioner of Patents and Trademarks*